United States Patent
Giacalone et al.

(10) Patent No.: US 11,621,864 B2
(45) Date of Patent: *Apr. 4, 2023

(54) GROUP CONTACT LISTS GENERATION

(71) Applicant: Snap Inc., Santa Monica, CA (US)

(72) Inventors: Ty Giacalone, Seattle, WA (US);
Donald Giovannini, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,459

(22) Filed: Aug. 4, 2021

(65) Prior Publication Data

US 2021/0367798 A1 Nov. 25, 2021

Related U.S. Application Data

(63) Continuation of application No. 16/798,287, filed on Feb. 21, 2020, now Pat. No. 11,108,581.

(51) Int. Cl.
*G06F 15/16* (2006.01)
*H04L 12/18* (2006.01)
*H04M 1/27457* (2020.01)
*H04M 1/72436* (2021.01)

(52) U.S. Cl.
CPC ...... *H04L 12/185* (2013.01); *H04M 1/27457* (2020.01); *H04M 1/72436* (2021.01)

(58) Field of Classification Search
CPC ............ H04L 12/185; H04M 1/27457; H04M 1/72436
USPC ........................................................ 709/206
See application file for complete search history.

(56) References Cited

U.S. PATENT DOCUMENTS

| 11,108,581 B1* | 8/2021 | Giacalone ............. H04L 12/185 |
| 2010/0205546 A1 | 8/2010 | Appelman et al. |
| 2011/0249144 A1 | 10/2011 | Chang |
| 2012/0124150 A1 | 5/2012 | Ge et al. |
| 2013/0335509 A1 | 12/2013 | Cafferata |
| 2015/0312372 A1 | 10/2015 | Armstrong et al. |

(Continued)

OTHER PUBLICATIONS

"U.S. Appl. No. 16/798,287, Non Final Office Action dated Jan. 6, 2021", 12 pgs.

(Continued)

*Primary Examiner* — Alan S Chou
(74) *Attorney, Agent, or Firm* — Schwegman Lundberg & Woessner, P.A.

(57) ABSTRACT

In some examples, a computer-implemented method includes accessing a contact database of a sending user, the contact database includes a plurality of contact records, each contact record of the plurality of contact records being associated with a respective user and including respective graphic data, identifying a first set of contact records of the plurality of contact records, each contact record of the first set of contact records having common graphic data as part of the respective graphic data, automatically including the first set of contact records in a contact group of a messaging application of the sending user, detecting a send message operation by a messaging application of the sending user, and causing presentation of a user-selectable graphic icon associated with the contact group within the messaging application, the user-selectable graphic icon being selectable by the sending user to send a message to the contact group.

20 Claims, 15 Drawing Sheets

(56) References Cited

U.S. PATENT DOCUMENTS

| | | | |
|---|---|---|---|
| 2016/0021179 A1* | 1/2016 | James | H04N 21/252 |
| | | | 709/204 |
| 2016/0165029 A1 | 6/2016 | Jegal et al. | |
| 2017/0109013 A1* | 4/2017 | Hong | H04L 51/04 |
| 2017/0195988 A1 | 7/2017 | Tumbi et al. | |
| 2018/0026929 A1 | 1/2018 | Nambiar et al. | |
| 2018/0130138 A1* | 5/2018 | Kumar | H04L 12/185 |
| 2018/0131660 A1* | 5/2018 | Lambert | G06Q 30/0241 |
| 2018/0131797 A1 | 5/2018 | Choi | |
| 2019/0132405 A1* | 5/2019 | Song | H04L 67/24 |
| 2020/0028815 A1* | 1/2020 | He | H04L 12/1859 |
| 2020/0034882 A1* | 1/2020 | Deng | G06Q 30/0244 |
| 2020/0322472 A1 | 10/2020 | Vance et al. | |

OTHER PUBLICATIONS

"U.S. Appl. No. 16/798,287, Notice of Allowance dated Apr. 29, 2021", 9 pgs.

"U.S. Appl. No. 16/798,287, Response filed Mar. 30, 2021 to Non Final Office Action dated Jan. 6, 2021", 8 pgs.

* cited by examiner

GROUP CONTACT LISTS GENERATION

CLAIM OF PRIORITY

This application is a continuation of U.S. patent application Ser. No. 16/798,287, filed Feb. 21, 2020, which is incorporated herein by reference in its entirety.

TECHNICAL FIELD

Embodiments of the present disclosure relate generally to computing systems and networks for generating group contact shortcuts in a social network application, including user interfaces to present the group contacts in the system.

BACKGROUND

In social media applications, the use of emojis, emoticons, and other avatars are common when organizing multiple contacts stored in a user account of a social media application. There are an array of emojis that are used to organize users into specialized groups for easy identification when sending messages, videos, images, or related media content. For instance, if a user has fifty contacts and ten of the contacts are the user's family members, the user may associate a heart emoji with the ten family members in order to specify that those ten users are family members.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
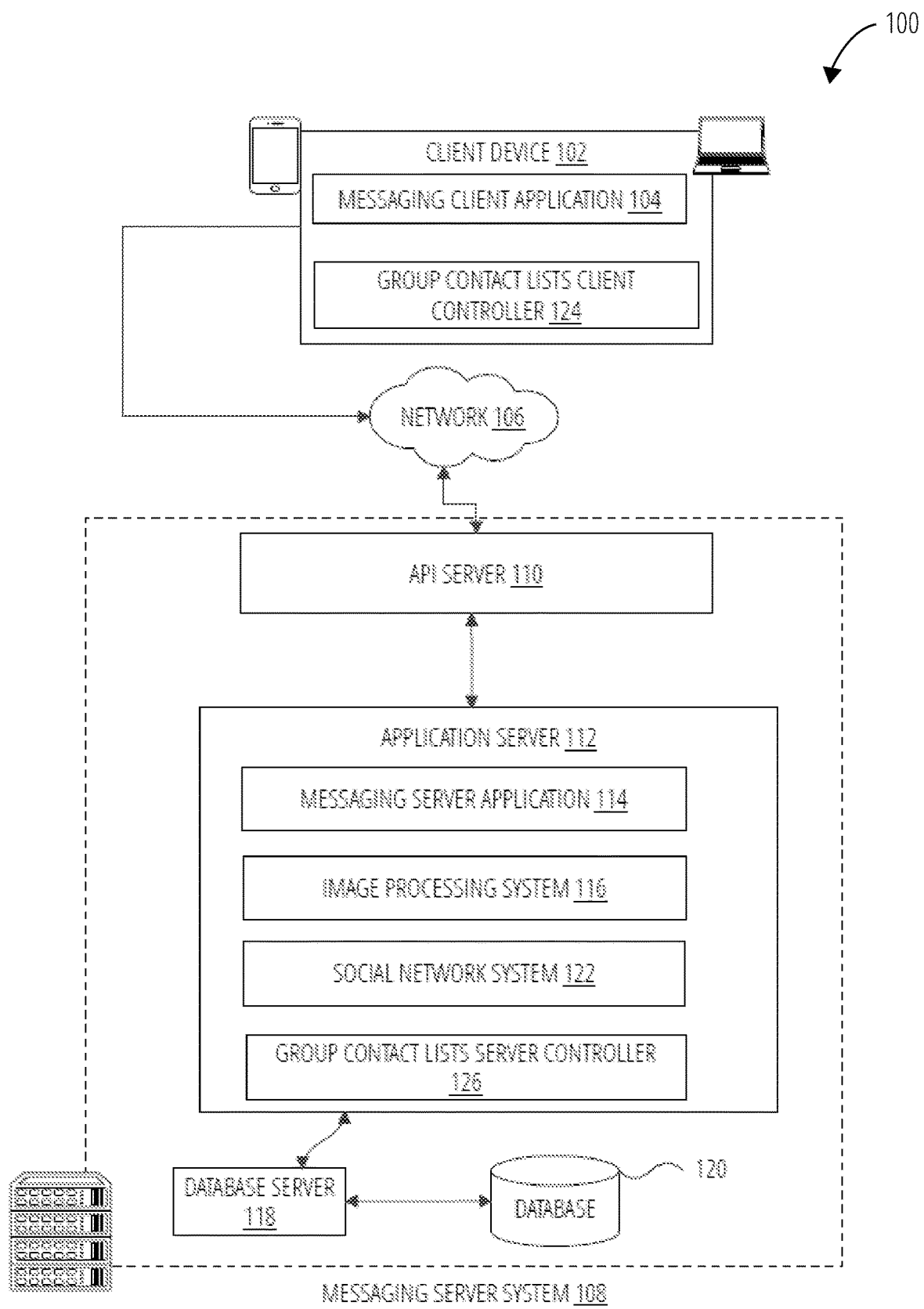
FIG. 1 depicts a block diagram of an example system in a network environment within which the present disclosure may be implemented in accordance with some example embodiments of the present disclosure.

While this practice has been used by users in the past, for users who typically have more than fifty contacts, for instance, a user with one hundred or more contacts, it becomes overwhelming, time consuming, and inefficient to scroll through all of the users' contacts in order to identify which users' contacts have similar or edited emojis describing them as being a part of a certain group prior to sending or transmitting a content media collection.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In one embodiment of the present disclosure, the system improves the functionality of group contact lists generation and management software by determining which individual contact display names have been modified or edited with a digital image, icon, emoji, avatar, or three-dimensional graphic and generating a new group contact list that includes each user contact that has been modified with the digital image, icon, emoji, avatar, or three-dimensional graphic. The modified or edited digital image, icon, or three-dimensional graphic is used to identify the new group contact lists.

The user may use the newly generated group contact lists to communicate a content collection and/or ephemeral messages to selected devices.

Accordingly, users who have a large number of users within their contact list will be able to quickly and efficiently group users together who share similar characteristics based on their edited display names, prior to transmitting content collections and ephemeral messages. The time it typically takes to transmit the content collections and ephemeral messages to a desired set of users is significantly reduced by this improved group contact list generation functionality.

A contact list comprises contacts within a contact database associated with the user. Each individual contact comprises information such as a contact name, nickname, address, digital image/icon, avatar, digital expression image (e.g., emoji, emoticon), or the like. Conventionally, a user can create multiple group contacts from the user's contact list in an interface designed for sending content collections and ephemeral messages to selected users. When attempting to transmit or communicate the content collections and ephemeral messages to a selected number of user contacts, however, the user must first search his or her entire contact list, select each intended user individually, and then transmit the content collections to the selected intended users.

Generally, users tend to edit the display names of specific individual contacts within their contact database in which they intend to send content collections and ephemeral messages. As such, in example embodiments, the system determines which individual contact display names have been modified to generate a new group contact list that includes each user contact that has been modified. For example, the system determines which individual contact display name has been modified by determining which individual contact's display name has a certain emoji, a digital image, icon, or three-dimensional graphic, or has had its emoji or digital image edited, The modified or edited digital image, icon, or three-dimensional graphic may be used to identify the new group contact list.

In one embodiment, the system implements a method of suggesting, in real time, which group contact list, based on the newly generated group contact lists, is likely to be selected by the user based on a ranking of which newly generated contact list is longest. In another embodiment, the system implements a method of suggesting, in real time, which group contact list is likely to be selected by the user based on which group contact list is most frequently used.

In an alternate embodiment, the system also compares the newly generated group contact list with other contact lists, such as contacts identified as "friends" or "best friends". The system determines duplicative and uncommon contacts between each list. The system may also generate and display a separate interface containing the duplicative and/or uncommon contact lists. In another embodiment, the system can edit, modify, or remove newly generated group contact list.

FIG. 1 depicts a block diagram of an example system in a network environment within which the present disclosure may be implemented in accordance with some example embodiments of the present disclosure. The system 100 includes multiple instances of a client device 102, each of which hosts a number of applications including a messaging client application 104 and a group contract lists controller 124. A client device may refer to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network. Each messaging client application 104 is communicatively coupled to other instances of the messaging client application 104 and a messaging server system 108 via a network 106 (e.g., the Internet). Each Group Contract Lists client controller 124 is communicatively coupled to other instances of the Group Contract Lists client controller 124 and a Group Contract Lists server controller 126 in the messaging server system 108 via the network 106.

Network 106, may be a communications network that may refer to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a messaging client application 104. While certain functions of the system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

The group contact lists client controller 124 is able to communicate and exchange data with another group contact lists server controller 124 in another client device 102 and with the group contact lists server controller 126 via the network 106. The data exchanged between the group contact lists client controller 124, and between the group contact lists client controller 124 and the group contact lists server controller 126 can include a request to search a database (e.g., database 120) for modified or edited digital icons, digital image representations, digital expression images, three-dimensional characters associated with the display name of a stored contact or a generated new group contact list which includes the contacts with edited digital icons, digital image representations, digital expression images, three-dimensional characters that are associated with the display name of a stored contact, and so forth.

In some cases, the group contact lists client controller 124 sends a request to the group contact lists server controller 126 to compute the determination as to whether any user contact display name stored in the database has been modified. For example, a user can have a plurality of contacts stored and each contact may include a contact interface which may include an associated name, nickname, digital icon, digital image representation, digital expression image, or three-dimensional character of the stored contact. If the user edits or modifies the contact display name or if the user edits or modifies a portion of the display name, including the digital icons, digital image representations, digital expression objects, digital expression images, or three-dimensional characters, the group contact lists server controller 126 can identify the modification and/or edit and group, aggregate, or generate one or more new data structures comprising one or more newly generated group contact list that includes each contact that has been modified. The group contact list server controller 126 can generate suggestions, in real time, of which group contact lists, based on the newly generated group contact lists, are likely to be selected by ranking the newly generated group contact lists by length. Once two or more newly generated group contact lists have been created, the group contact list server controller 126 can organize and sort the generated group contact lists according to frequency of use. The group contact lists server controller 126 can transfer the newly generated group contact list and associated suggestion interface back to the group contact list client controller 124.

In one example embodiment, the group contact lists sever controller 126 also use a comparison determinative algorithm to determine duplicative and uncommon contacts between each newly generated group contact list and other contact lists stored in the contact database (e.g., database 120). For example, the group contact lists server controller 126 compares each of newly generated group contact list with each other contact list stored in the database, such as a "friends" contact lists or "best friends" contact list to determine duplicative and uncommon contacts between each list. The group contact lists sever controller 126 can generate a separate interface which can include the duplicative and/or uncommon contact lists.

Still referring to FIG. 1, the messaging server system 108 includes an Application Program Interface (API) server 110 that is coupled to, and provides a programmatic interface to, an application server 112. The application server 112 is communicatively coupled to a database server 118, which facilitates access to a database 120 in which is stored data associated with messages processed by the application server 112. The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112.

The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data, e.g. content collection or set of content collections, the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The term, "content", as described herein, may refer to one or more images or video clips captured by an electronic device, as well as any associated metadata descriptions and graphics or animation added to the image or video clip. This may include metadata generated by an electronic device capturing an image or video, as well as metadata that may be associated later by other devices. A "piece of content" may refer to an individual image or video clip captured by a client device with any changes made to the image or video clip (e.g. transformations, filters, added text, etc.). Individual pieces of content may have multimedia elements, including drawings, text, animations, emoji, or other such elements added along with image or video clip elements. Content captured by an image sensor of a client device may be sent, along with any added multimedia elements from a user, via a network to other client devices as part of a social sharing network. Individual pieces of content may have time limits or associated display times, which are within a display threshold set by a system. For example, an embodiment system may limit video clips to 10 seconds or less and may allow users to select display times less than 10 seconds for image content.

A "content message" as referred to herein may refer to the communication of content between one or more users via the system. Content may also be sent from a client device to a server system to be shared generally with other system users. Some embodiments limit content messages to images or video clips captured using an interface that does not allow the content to be stored and sent later, but instead uses an associated content message with a single piece of content and any added multimedia to be sent before any other action is taken on the device. Embodiments described herein relate to methods of grouping such content into content collections. In various systems, content messages may be sent from one individual user to another individual user, as, for example, an ephemeral message in addition to the ability to send content messages to a server computer system for inclusion in various content collections.

A "content collection" as described herein is an ordered set of content. The individual pieces of content that make up a particular content collection may be related in a variety of different ways. For example, in some embodiments, a content collection includes all pieces of content marked as public that are sent to a server system from a particular user within a certain time frame (e.g., within the past 24 hours). Access to such a content collection can be limited to certain other users (e.g., friends) identified by the user that generates the content for the collection. In some other embodiments, content collections include pieces of content from different users that are related by time, location, content, or other metadata. In some embodiments, content collections are referred to as stories. A content collection or content collection may be generated from pieces of content that are related in a variety of different ways, as is described in more detail throughout this document.

The Application Program Interface (API) server 110 receives and transmits message data, including content messages or content collections (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data, the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104). The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user, or particular contacts designated or created by the user. The application server 112 is communicatively coupled to a database server 118, which facilitates access to a database 120 in which is stored data associated with messages processed by the messaging server application 114.

The application server 112 also includes the group contact lists server controller 126 that can communicate with the group content lists client controller 124 in the client device 102 to generate new group contact lists based on commonly edited display names, and associate a digital icon, digital image representation, digital expression image, digital expression object, or three-dimensional character with the each new group contact list. The group content server controller may also transmit a content collection and/or ephemeral message using the associated digital icon, digital image representation, digital expression image, or three-dimensional character of the newly generated group contact list as a search query within a search query field of the social media application. The group contact lists server controller 126 can also be coupled to the messaging server application 114 to establish an electronic group communication session (e.g., group chat, instant messaging) for other client devices within the network. The electronic group communication session can be associated with a session identifier provided by the client devices 102 to gain access to the electronic group communication session.

Figure 2:
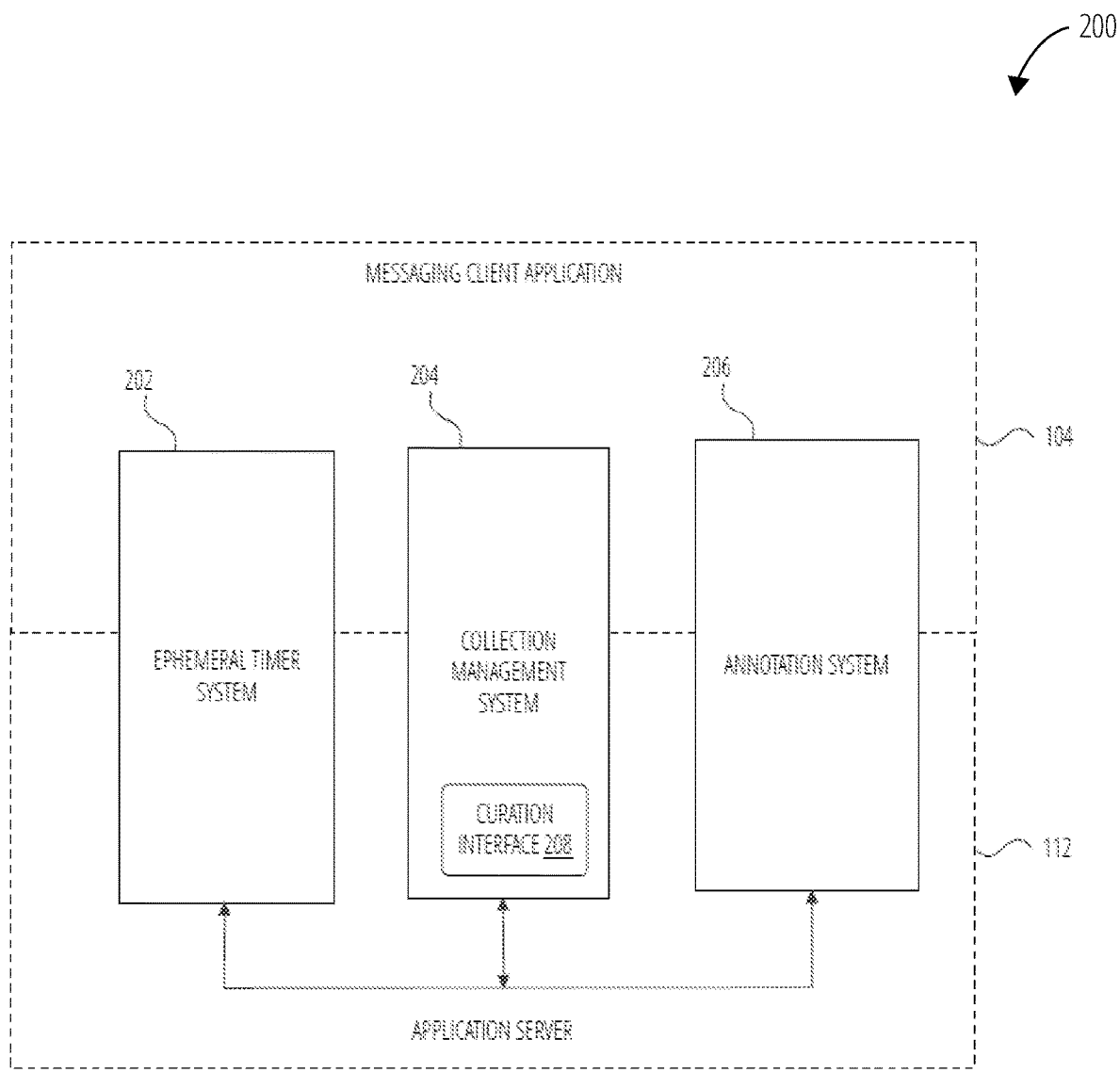
FIG. 2 depicts a block diagram of a messaging client application in accordance with some example embodiments of the present disclosure.

FIG. 2 depicts a block diagram of a messaging client application in accordance with some example embodiments of the present disclosure. For example, the system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, a collection of content, or collection of messages (e.g., a content collection), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event content collection." Such a collection may be made available for a specified time period, such as the duration of an event to which the content relates. For example, content relating to a music concert may be made available as a "content collection" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. Machine vision may also be utilized to identify a display name, media content, images, texts, emojis, digital representation objects or avatars that may be arranged in a contact digital interface (explained below). In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
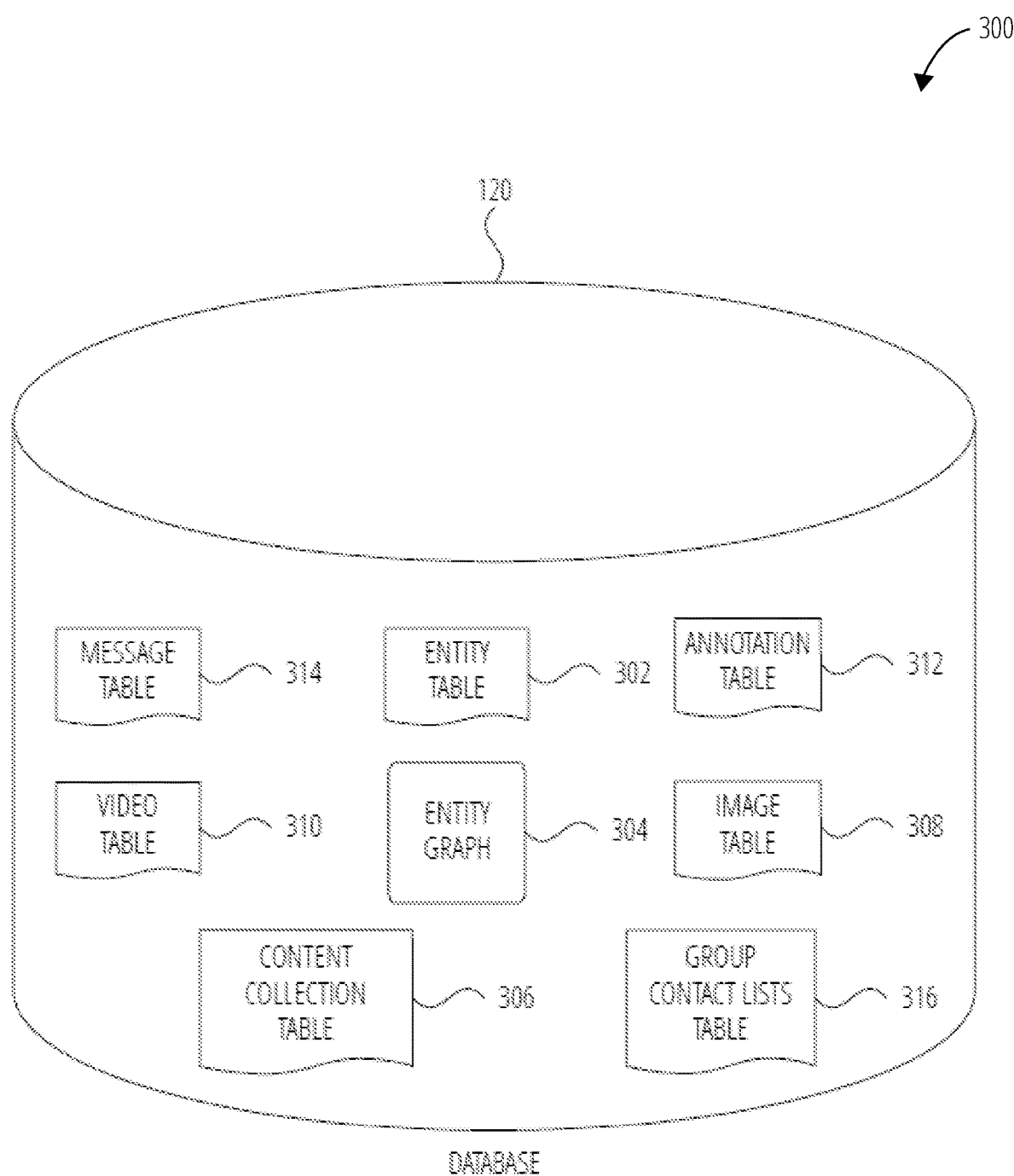
FIG. 3 depicts a block diagram of a data structure as maintained in a database in accordance with some example embodiments of the present disclosure.

FIG. 3 depicts a block diagram of a data structure as maintained in a database in accordance with some example embodiments of the present disclosure. While the content of the database 120 is shown to comprise a number of tables, it will be appreciated that the data could be stored in other types of data structures (e.g., as an object-oriented database). The database 120 includes message data stored within a message table 314. The entity table 302 stores entity data, including an entity graph 304. Entities for which records are maintained within the entity table 302 may include individuals known as contacts, group contacts, groups of individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown). The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time. Other annotation data that may be stored within the image table 308 real-time special effects and sounds that may be added to an image or a video.

The video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A content collection table 306 stores data regarding collections of messages and associated image, video, or audio data, which are compiled into a collection, set of content collections, or content collection (e.g., a content collection or a gallery). The creation of a particular collection may be initiated by a particular user (e.g., each user for which a record is maintained in the entity table 302). A user may create a "personal content collection" in the form of a collection of content that has been created and sent/broadcast by that user. To this end, the user interface of the messaging client application 104 may include an icon that is user-selectable to enable a sending user to add specific content to his or her personal content collection.

A collection may also constitute a "live content collection," which is a collection of content from multiple users that is created manually, automatically, or using a combination of manual and automatic techniques. For example, a "live content collection" may constitute a curated stream of user-submitted content from varies locations and events. Users whose client devices have location services enabled and are at a common location event at a particular time may, for example, be presented with an option, via a user interface of the messaging client application 104, to contribute content to a particular live content collection. The live content collection may be identified to the user by the messaging client application 104, based on his or her location. The end result is a "live content collection" told from a community perspective.

A further type of content collection is known as a "location content collection", which enables a user whose client device 102 is located within a specific geographic location (e.g., on a college or university campus) to contribute to a particular collection. In some embodiments, a contribution to a location content collection may require a second degree of authentication to verify that the end user belongs to a specific organization or other entity (e.g., is a student on the university campus).

The database 120 can also store data pertaining to user contact information and generated group contact lists information, including a digital icon, digital image representation, digital expression image, or three-dimensional character of the stored contact in the group contact lists table 316. The data pertaining to the user contact information may be arranged in a contact digital interface. The data in the group contact list table 316 and associated contact digital interface can include an associated name, address, content collection counter icon data, digital icon, digital image representation, digital expression image, or three-dimensional character of the stored contact.

Figure 4:
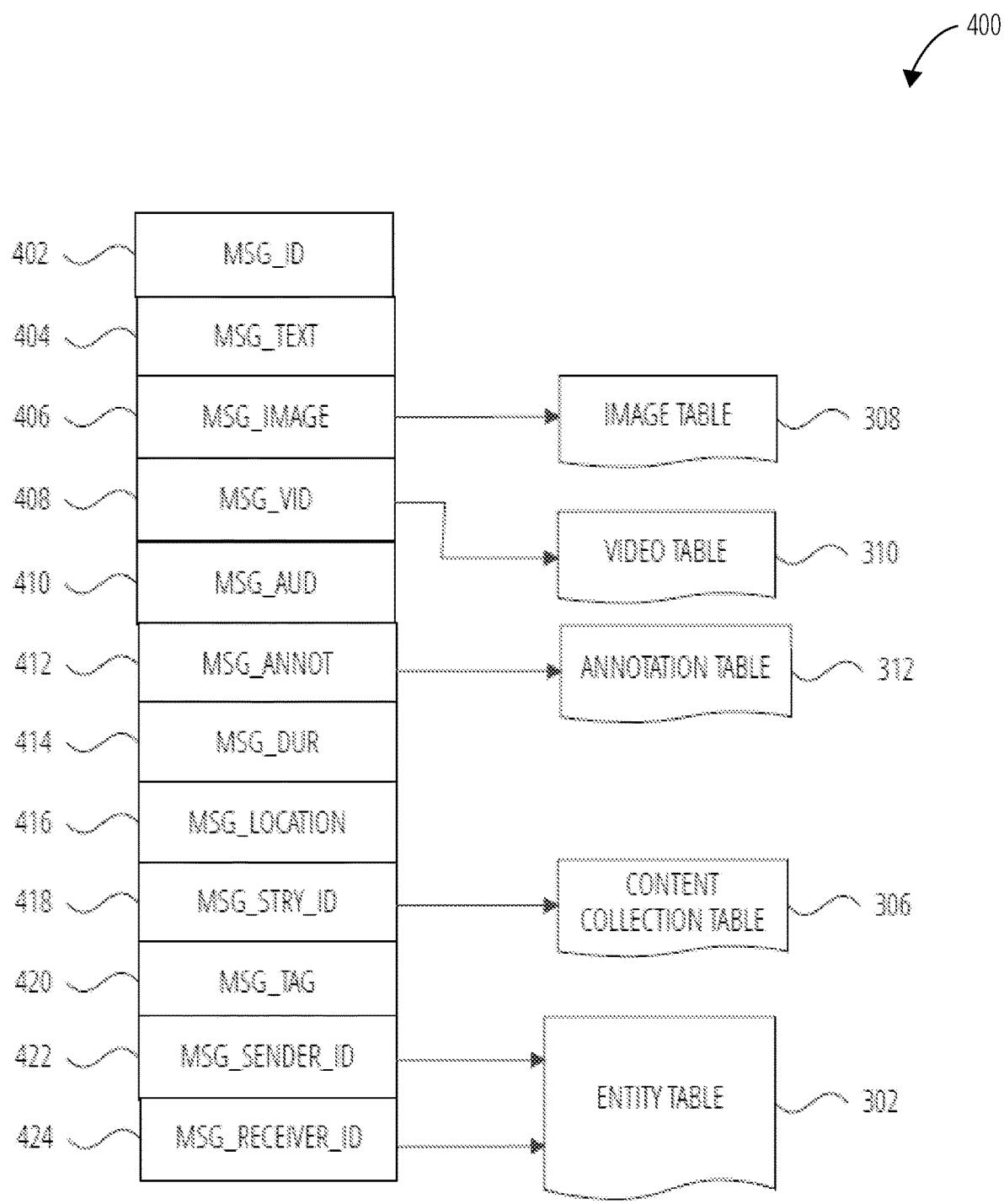
FIG. 4 depicts a block diagram of a messaging 400 in accordance with some example embodiments of the present disclosure.

FIG. 4 depicts a block diagram of a messaging 400 in accordance with some example embodiments of the present disclosure. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

1. A message identifier 402: a unique identifier that identifies the message 400.
2. A message text payload 404: text, to be generated by a user via a user interface of the client device 102 and that is included in the message 400.
3. A message image payload 406: image data, captured by a camera component of a client device 102 or retrieved from a memory component of a client device 102, and that is included in the message 400.
4. A message video payload 408: video data, captured by a camera component or retrieved from a memory component of the client device 102 and that is included in the message 400.
5. A message audio payload 410: audio data, captured by a microphone or retrieved from a memory component of the client device 102, and that is included in the message 400.
6. A message annotations 412: annotation data (e.g., filters, stickers or other enhancements) that represents annotations to be applied to message image payload 406, message video payload 408, or message audio payload 410 of the message 400.
7. A message duration parameter 414: parameter value indicating, in seconds, the amount of time for which content of the message (e.g., the message image payload 406, message video payload 408, message audio payload 410) is to be presented or made accessible to a user via the messaging client application 104.
8. A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
9. A message content collection identifier 418: identifier values identifying one or more content collections with which a particular content item in the message image payload 406 of the message 400 is associated. For example, multiple images within the message image payload 406 may each be associated with multiple content collections using identifier values.
10. A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
11. A message sender identifier 422: an identifier (e.g., a messaging system identifier, email address, or device identifier) indicative of a user of the client device 102 on which the message 400 was generated and from which the message 400 was sent
12. A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message content collection identifier 418 may point to data stored in a content collection table 306, and values stored within the message sender identifier 422 and the message receiver identifier 424 may point to user records stored within an entity table 302.

The components may also refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically generated, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components.

In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Figure 5:
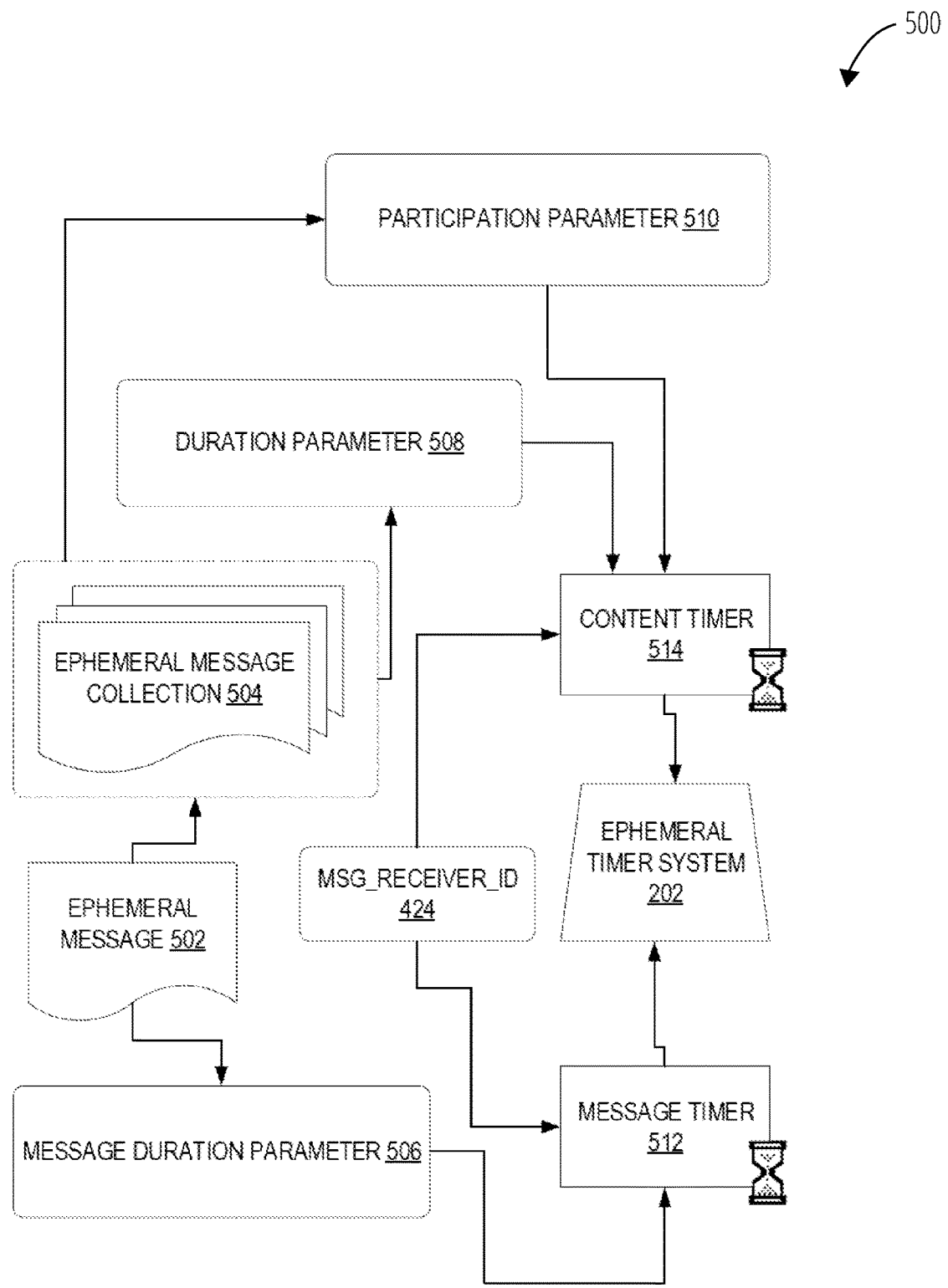
FIG. 5 is a schematic block diagram illustrating an example access-limiting process, in terms of which access to content (e.g., an ephemeral message, and associated multimedia payload of data) or a content collection (e.g., an ephemeral message content collection) may be time-limited (e.g., made ephemeral) in accordance with some embodiments of the present disclosure.

FIG. 5 is a schematic block diagram illustrating an example access-limiting process, in terms of which access to content (e.g., an ephemeral message, and associated multimedia payload of data) or a content collection (e.g., an ephemeral message content collection) may be time-limited (e.g., made ephemeral) in accordance with some embodiments. An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an ephemeral messaging application client, an ephemeral message 502 is viewable by a receiving user for up to a maximum of 10 seconds, depending on the amount of time that the sending user specifies using the message duration parameter 506.

An ephemeral message 502 may refer to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory, even if the message is temporarily stored in a non-transitory computer readable medium. A non-transitory computer readable medium may refer to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message collection 504 (e.g., a personal content collection, a location content collection, or an event content collection). The ephemeral message collection 504 has an associated content collection duration parameter 508, a value of which determines a time-duration for which the ephemeral message collection 504 is presented and accessible to users of the messaging system 100. The content collection duration parameter 508, for example, may be the duration of a music concert, where the ephemeral message collection 504 is a collection of content pertaining to that concert. Alternatively, a user (either the owning user or a curator user) may specify the value for the content collection duration parameter 508 when performing the setup and creation of the ephemeral message collection 504.

Additionally, each ephemeral message 502 within the ephemeral message collection 504 has an associated participation parameter 510, a value of which determines the duration of time for which the ephemeral message 502 will be accessible within the context of the ephemeral message collection 504. Accordingly, a particular ephemeral message collection 504 may "expire" and become inaccessible within the context of the ephemeral message collection 504, prior to the ephemeral message collection 504 itself expiring in terms of the duration parameter 508. The duration parameter 508, participation parameter 510, and message receiver identifier 424 each provide input to a content timer 514, which operationally determines, firstly, whether a particular ephemeral message 502 of the ephemeral message collection 504 will be displayed to a particular receiving user and, if so, for how long. Note that the ephemeral message collection 504 is also aware of the identity of the particular receiving user as a result of the message receiver identifier 424.

Accordingly, the content timer 514 operationally controls the overall lifespan of an associated ephemeral message collection 504, as well as an individual ephemeral message 502 included in the ephemeral message collection 504. In one embodiment, each and every ephemeral message 502 within the ephemeral message collection 504 remains viewable and accessible for a time-period specified by the duration parameter 508. In a further embodiment, a certain ephemeral message 502 may expire, within the context of ephemeral message collection 504, based on a participation parameter 510. Note that a message duration parameter 506 may still determine the duration of time for which a particular ephemeral message 502 is displayed to a receiving user, even within the context of the ephemeral message collection 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message collection 504.

The ephemeral timer system 202 may furthermore operationally remove a particular ephemeral message 502 from the ephemeral message collection 504 based on a determination that it has exceeded an associated participation parameter 510. For example, when a sending user has established a participation parameter 510 of 24 hours from posting, the ephemeral timer system 202 will remove the relevant ephemeral message 502 from the ephemeral message collection 504 after the specified 24 hours. The ephemeral timer system 202 also operates to remove an ephemeral message collection 504 either when the participation parameter 510 for each and every ephemeral message 502 within the ephemeral message collection 504 has expired, or when the ephemeral message collection 504 itself has expired in terms of the duration parameter 508.

In certain use cases, a creator of a particular ephemeral message collection 504 may specify an indefinite duration parameter 508. In this case, the expiration of the participation parameter 510 for the last remaining ephemeral message 502 within the ephemeral message collection 504 will determine when the ephemeral message collection 504 itself expires. In this case, a new ephemeral message 502, added to the ephemeral message collection 504, with a new participation parameter 510, effectively extends the life of an ephemeral message collection 504 to equal the value of the participation parameter 510.

Responsive to the ephemeral timer system 202 determining that an ephemeral message collection 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message collection 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
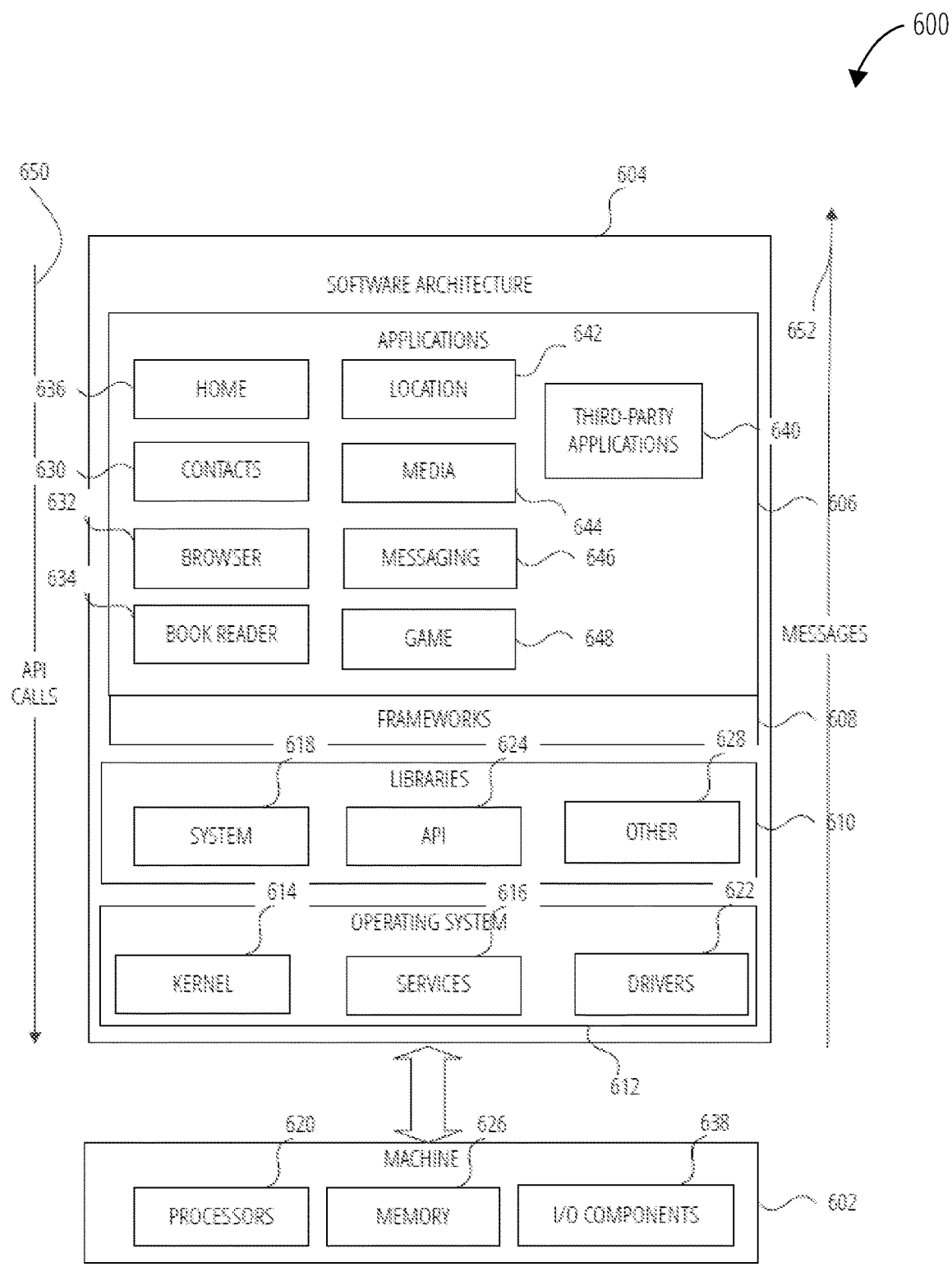
FIG. 6 is a block diagram illustrating a software architecture within which the present disclosure may be implemented in accordance with some example embodiments of the present disclosure.

FIG. 6 is a block diagram illustrating a software architecture within which the present disclosure may be implemented in accordance with some example embodiments of the present disclosure. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650. The processor 620 may refer to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
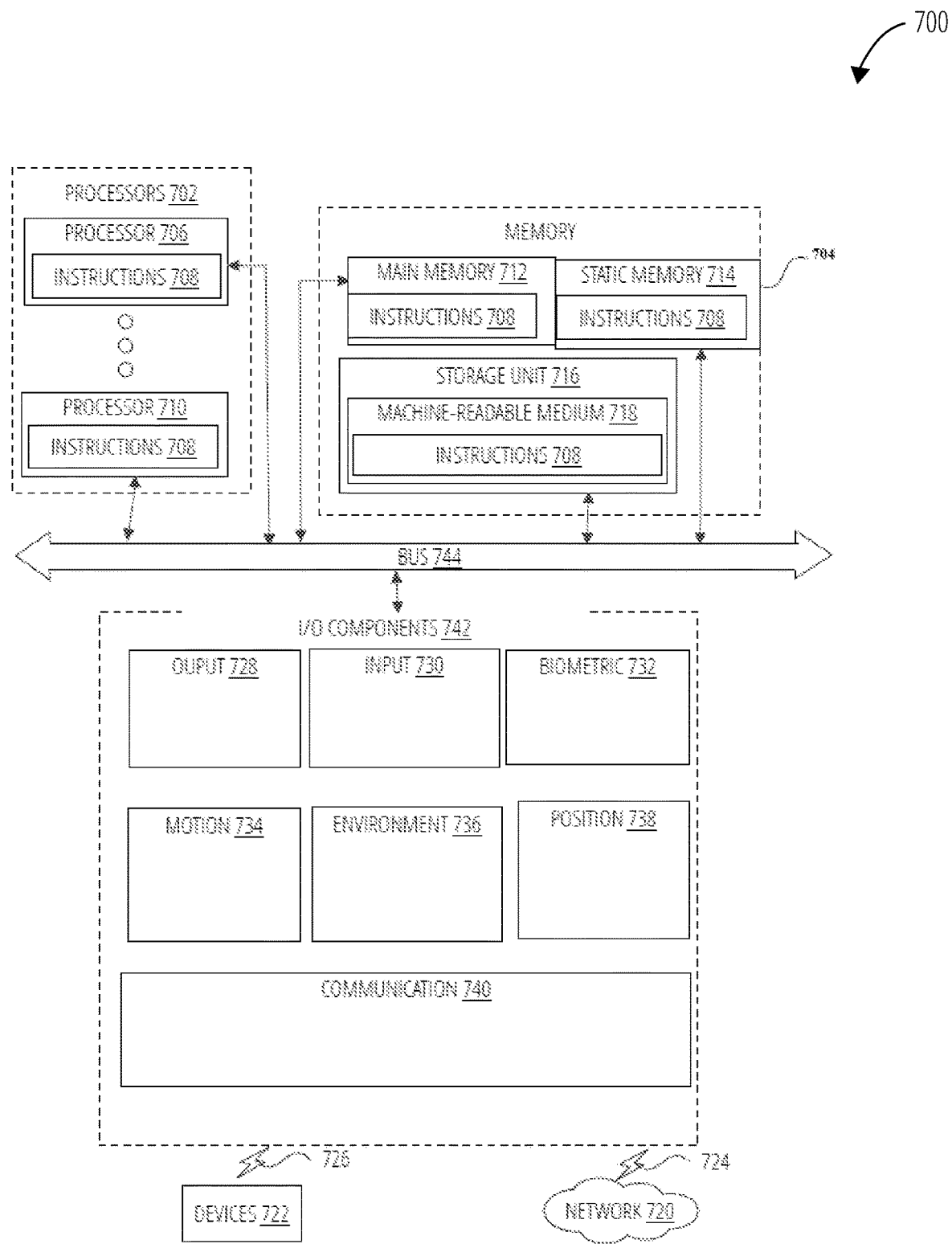
FIG. 7 is a block diagram representation of a machine, in the form of a computer system within which a set of instructions may be executed for causing the machine to perform any one or more of the features discussed, in accordance with some example embodiments of the present disclosure.

FIG. 7 is a block diagram representation of a machine, in the form of a computer system within which a set of instructions may be executed for causing the machine to perform any one or more of the features discussed, in accordance with some example embodiments of the present disclosure. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
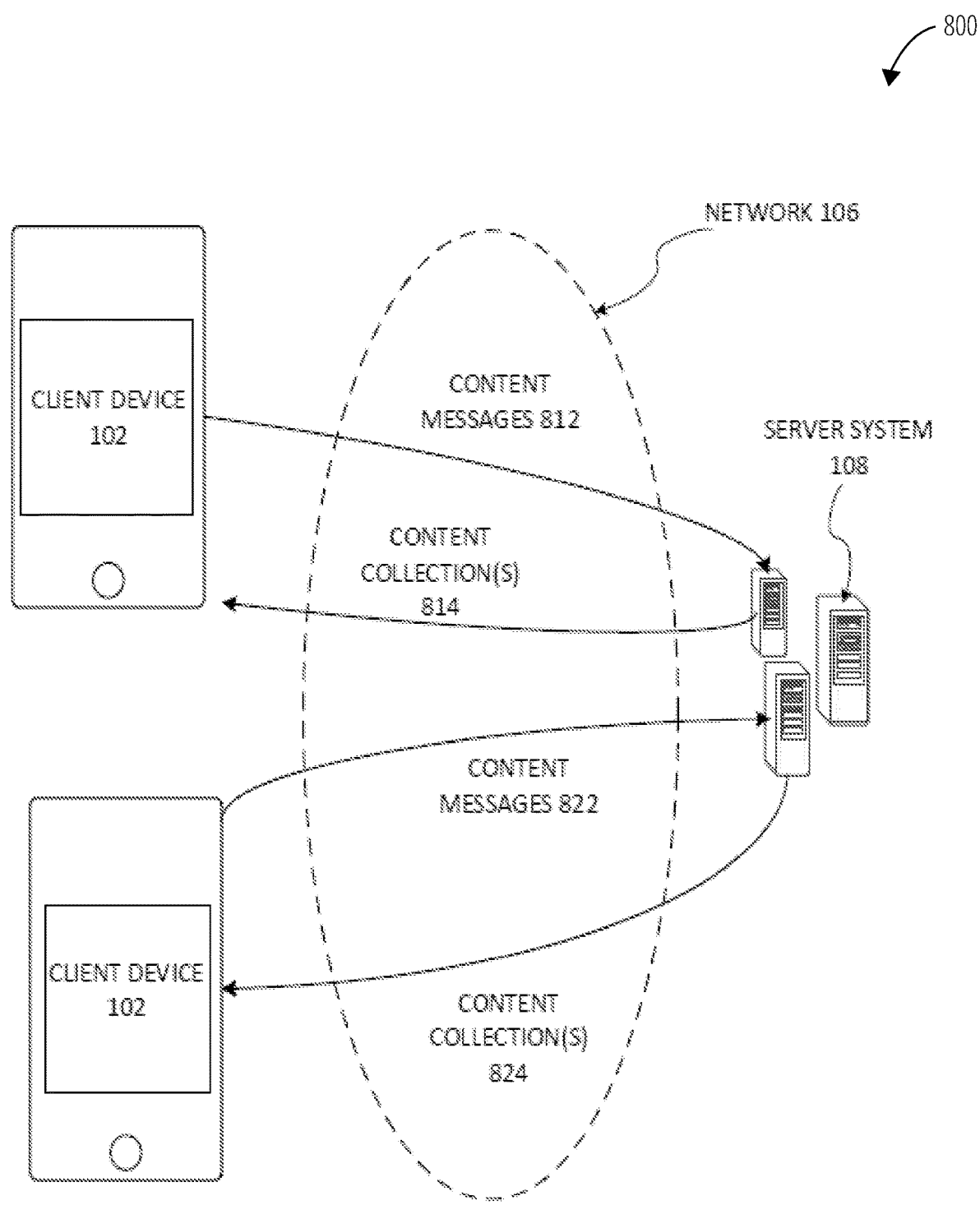
FIG. 8 illustrates a system for communicating content messages and content collections in accordance with some embodiments of the present disclosure.

FIG. 8 illustrates a system for communicating content messages and content collections in accordance with some embodiments of the present disclosure. System 800 includes client device 102, client device 102, server system 108, and network 106 that is used to convey communications between client devices 102 and 102 and the server system 108. Client devices 102 may be any smartphone, tablet, phablet, laptop computer, network-enabled camera, or any other such network enabled device. Client devices 102 may include a camera device for capturing content or may be coupled to a separate camera device that is used to capture the content prior to sending to other client device 102 for storage. Other embodiments may include other associated devices with an integrated camera that may be wearable such as a watch, eyeglasses, clothing such as a hat or jacket with integrated electronics, a clip-on electronic device, or any other such devices that may communicate or be integrated with a client device 102. Client devices 102 are connected to server system 108 via network 106. The network 106 may include any combination of wired and wireless connections. In some embodiments, client devices 102, as well as any elements of server system 108 and network 106, may be implemented using elements of software architecture or machine examples described below.

Networked system 800 then may be used in communication of content messages from client devices 102 to a system 108, and communication of content collections from the system 108 to the client devices 102. Client device 102 communicates content message 812 to server system 108, and client device 102 receives content collections 814 from server system 108. In some embodiments, content message(s) 812 include some or all elements of message 400 described above. In some embodiments, some elements of message 400 are included as part of communication of a content message 812, and another portion of the elements (e.g., content collection table 306, etc.) are added by server system 108 after the content (e.g., video, audio, text, or other such content elements) of content messages 812 is analyzed by the server system 108. Content messages 812 are thus processed and analyzed by server system 108 to generate content collections in accordance with the details below.

In addition to this functionality, used for the embodiments described herein, client device 102 may additionally receive private pieces of content and communications from other users, and may convey a personal content collection to server system 108, with the personal content collection including images and or video from content messages 812 generated by client device 102 or another device coupled to client device 102. Similarly, client device 102 sends content messages 622 and receives content collections 824 and may additionally perform other actions.

Figure 9:
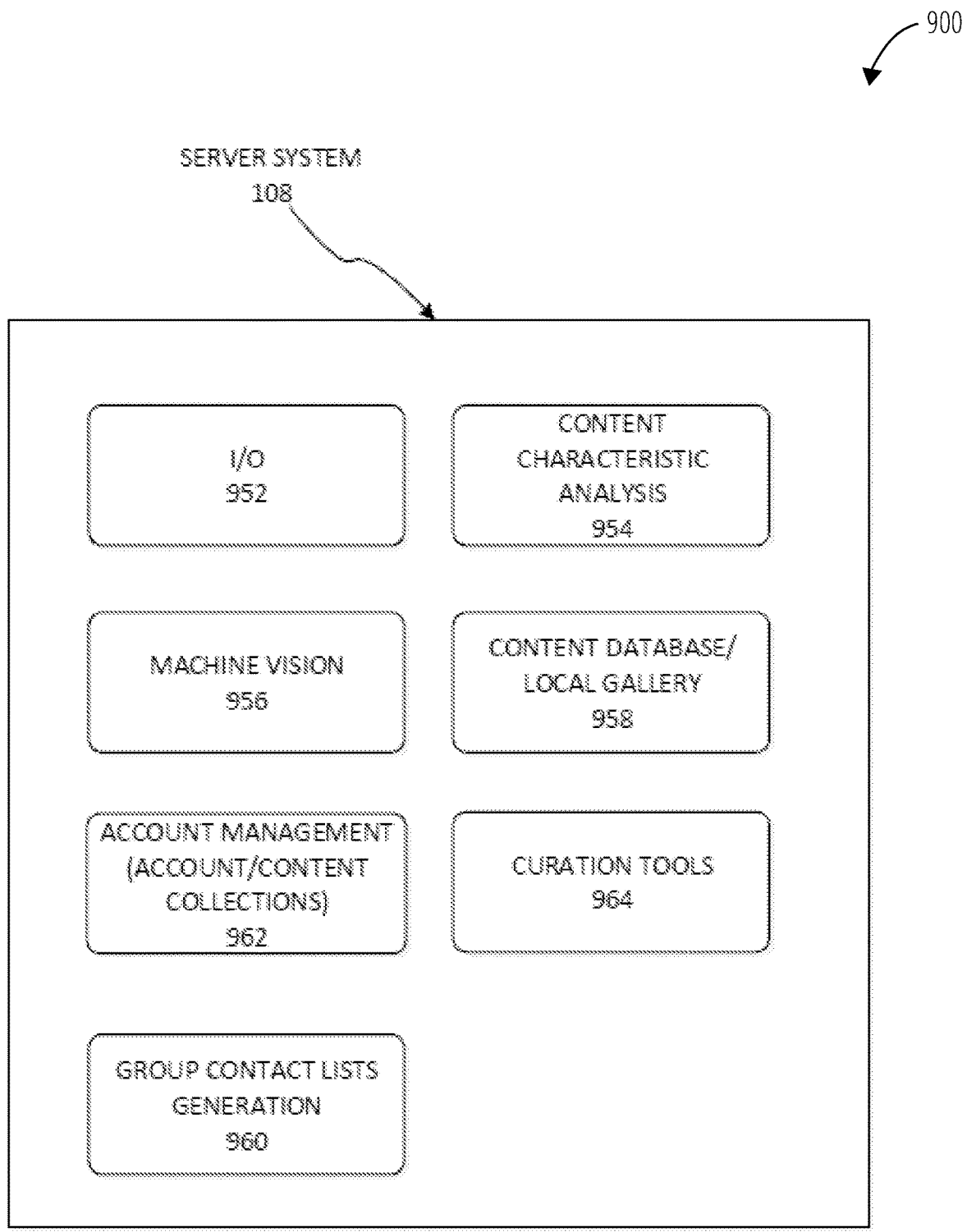
FIG. 9 illustrates aspects of systems and devices for generating group contacts based on modified user contact in accordance with some embodiments of the present disclosure.

FIG. 9 illustrates aspects of systems and devices for generating group contacts based on modified user contact in accordance with some embodiments of the present disclosure. In various embodiments, server system 108 may be used as an implementation of server system 650 or application server 112. The example server system 108 includes input and output (I/O) module 952, content characteristic analysis module 954, machine vision module 956, content database 958, account management module 962, automatic content collection generation module 960, and curation tools 964.

I/O module 952 may include any hardware, firmware, or software elements needed to send and receive content and content collections to client devices 102 via a network. Content characteristic analysis module 954 may include devices, processors, and software to analyze images from pictures and frames of video clips, and then determine content characteristics, including details about when and where a picture or video was generated. In certain embodiments, content characteristic analysis module 954 may be implemented as a plurality of different modules, each analyzing a different content characteristic, including any content characteristic described herein.

Machine vision module 956 describes a module that is used to identify content characteristics based on the content of an image or images in a video. Machine vision module 956 includes hardware, firmware, and/or software for analyzing and understanding content. In one embodiment, machine vision module 956 is associated with a dictionary comprising image and video content values. Objects identified in images of a piece of content and the arrangement of the identified objects therein may be used by machine vision module 956 to select one or more content values from the dictionary as content characteristics. Machine vision may also be utilized to identify a display name, media content, images, texts, emojis, digital representation objects or avatars that may be arranged in a contact digital interface (explained below).

For example, a simple machine vision module 956 can identify a ball in an image and select the values "ball" and "game" as content characteristics. A more complex module may identify the type of ball as a basketball and include "basketball" as a characteristic value. A still more complex machine vision module 956 may identify a basketball, a crowd, a court color, and an elevated perspective of the court to identify "professional basketball game" and "basketball arena" as content values for the content. The same complex machine vision module 956 may identify a basketball, a park background, and a concrete court surface and associate "amateur basketball game" and "playground basketball" as content values for the content. Such content values may operate as context values which are used to generate content collections as described herein.

Other types of context values besides such content values, however, may be used to generate content collections without using content values, or in addition to such content values. For example, one embodiment of an image may have associated context data comprising location data (e.g. coordinates or a geofence), time data (e.g. a time of day, a day of the month, an hour, etc.) content values (e.g. trees, basketball court, a face, etc.) quality values (e.g. blur, exposure, brightness, contrast, etc.) or any other such values which are referred to herein as context data.

These content values generated by machine vision module 956 can then be stored in content database 958 along with other characteristic values. Such characteristic values can include: one or more content values (i.e., an identification of what's in the content); a generation time; a generation time period; a generation location; a generation area; one or more quality values; any metadata value associated with content; an identifier for a particular piece of content; or any other such values. In some embodiments, a copy of content may be stored in content database 958 with location information, capture time information, and any other such information about a piece of content. In certain embodiments, content database 958 may anonymously store details about content use.

For example, client devices 102 can communicate details about presentation of the content on a screen of the device, and about screenshots taken of the content. Anonymous metrics about how often a piece of content is viewed as part of a content collection, how long the content is viewed for, and how frequently screenshots are taken may then be measured by server system 108, as part of analysis by content characteristic analysis module 954, with the resulting data stored in content database 958. In some embodiments, content database 958 may include this content information with any content or content message information discussed above or in any database or table structure discussed above.

Account management module 962 includes application or interface functionality to enable users to manage entity/account relationships via communications between user devices and server system 108. Account management module 962 may also manage an individual user's content collections as described herein.

Curation tools 964 include tools available to system operators or advertisers to generate and present content collections from large amounts of content received at server system 108 and made available by user selection to be included in public content collections (e.g., live content collections, location content collections, content-based content collections, etc.). Similarly, automatic content collection generation module 960 may filter large numbers of received pieces of content to generate content collections grouped by location, time, topic, or on any other such basis. In some embodiments, elements of automatic content collection generation module 960 are used to filter the number of pieces of content provided to curation tools 964 to a smaller number (e.g., filtering 10000 received pieces of content to provide 900 pieces of content to curation tools 964 for review by system operators).

In some embodiments, automatic content collection generation module 960 may then use information about pieces of content from content database 958 to select particular pictures or videos for an automatically generated content collection. In various embodiments, automatic content collection generation module 960 may use complex scoring, weighting, and other rules in generating a content collection. For example, certain embodiments may function such that all pieces of content meet a quality threshold unless a trend having certain threshold characteristics is identified and all content associated with the trend are below the quality threshold. Another embodiment may weight content collection generation based on a number of content collections currently available in a local geographic area. In still further embodiments, any number of complex rules may be applied together as part of content collection generation to filter images and videos for a content collection based on time, location, content, and quality.

In some embodiments, quality scoring within automatic content collection generation module 960 may be used to filter or select pieces of content for a particular content collection and to filter different content collections for presentation to a user. A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores or may be generated in any other such matters. For video where multiple sample frames are analyzed, an average of scores for each frame may be used to select a score, a worst score for an individual frame of all the analyzed frames may be used, or any such combination or function of multiple scores or selections of scores may be used.

In some embodiments, motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shake above the threshold. In other embodiments, a shakiness or motion score may simply modify an overall quality score. In other embodiments, both a hard threshold as well as an input to an overall quality score may be used.

In some embodiments, images or sample video frames may be analyzed for compression artifacts or other image processing artifacts that indicate a lower image quality or errors introduced into an image due to various compression or communication problems. Such artifacts may include image ringing, image contouring, staircase noise along curving edges, posturizing artifacts, or block boundary artifacts. Videos may be analyzed for additional video-based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio-based information, may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g., taboo spoken language or explicit music lyrics) can be used for a quality score or a quality threshold flag, in some embodiments.

In addition to quality scores based on image quality, some scores may be based on image content. For example, as mentioned above, image processing may be used to identify objectionable content such as nudity or taboo language within an image or video clip. In some embodiments, a preferred orientation (e.g., landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score.

Feedback or machine learning may be used, in certain embodiments, to select or set a quality score. Such systems may use neural networks to extract features identified as preferred or interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set.

Feature maps used within such neural networks may be based on any analysis metric described herein, including image quality features and image content features. In some embodiments, learnable filters may be selected and automatically updated based on a database of images from image processing services used for content analysis of images or video frames. In other embodiments, any other such sources may be used for learnable filters. Such analysis may be applied to both image elements of content as well as to audio elements of videos.

Other feedback mechanisms may be used in various embodiments. For example, in some embodiments, a content source, user, or account associated with generating an image or video clip may have associated content collection data. In some embodiments, association of a content source with a content collection of content selected by system users or associated with high quality ratings may be used as an input to a quality score, or may be used as a quality flag. Various content source metrics such as the quality content collection, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality scores, an audio quality score, a content score, or any other such separate quality scores. In such embodiments, an overall quality score based on any combination of such individual quality scores may also be provided. Further, as mentioned above, some or all of such quality scores may individually be used to reject certain pieces of media content automatically, with only the images or videos that exceed all thresholds being presented to a system user.

Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night. Further, aggregated interest and quality scores for complete sets of content collections (e.g., balanced or weighted scoring for pieces of content within a content collection) are used to sort and select content collections for presentation to a user.

Figure 10:
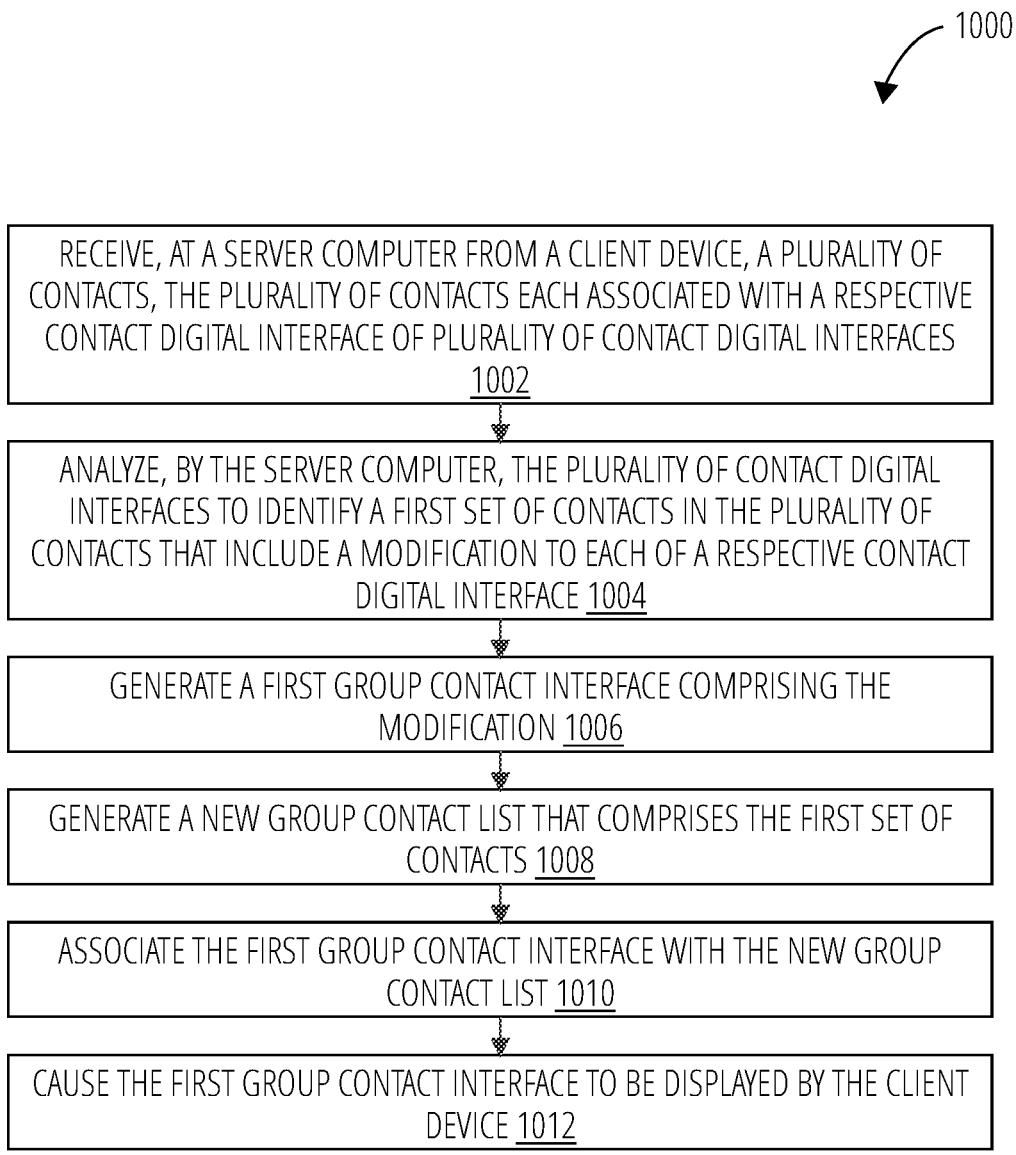
FIG. 10 is a flow chart of an example method in accordance with at least one embodiment of the present disclosure.

FIG. 10 is a flow chart of an example method 1000 for generating a new group contact list, in accordance with at least one embodiment of the present disclosure. Method 1000 begins at block 1002, where a server computer receives from a client device, a plurality of contacts. In one example, each of the plurality of contacts are associated with at least one contact digital interface. As explained above, contact digital interfaces include a display name, digital expression object, an associated name, address, content collection counter icon data, digital icon, digital image representation, digital expression image, or three-dimensional character of the stored contact and the like that can be arranged in an interface displayed in the social media/messaging client application. The plurality of contacts may be any type of user or entity that is stored in a database. The plurality of contacts comprises current and/or past users that are entered into the device manually by the user or automatically uploaded by third party system or server.

In one example embodiment, the plurality of contacts each may include one or more contact digital interface and display name. The contact digital interface generated for each of the plurality of contacts discloses, inputs, outputs, stores, organizes and/or arranges the associated contact name, nick-name, address, phone number, emoji, emoticon, image, video, three-dimensional graphic, an ephemeral content message counter icon, a content collection counter icon, an alpha-numeric character, or a numeric character into a user friendly visual interface in which the user can easily identify.

The display name may include one or more of a contact name, (e.g., first, last, middle), digital expression object, a nickname, an address, a phone number, an emoji, an emoticon, an image, a video, a three-dimensional graphic, an ephemeral content message counter icon, a content collection counter icon, an alpha-numeric character, or a numeric character.

At block 1004, the server computer analyzes the plurality of contact digital interfaces to identify a first set of contacts in the plurality of contacts that include a modification. In one example, the modification is a change to a display name in the contact digital interface for each contact of the first set of contacts. As mentioned above, the display name in the contact digital interface may include a name, a digital expression object, a display characteristic, a nickname, an address, a phone number, an emoji, an emoticon, an image, a video, a three-dimensional graphic, an ephemeral content message counter icon, a content collection counter icon, an alpha-numeric character, a digital representation icon (e.g. Avatar, or image representing a contact within the plurality of contacts) or a numeric character.

A modification to the display name comprises an edit, change, or manipulation to at least a portion of the display name in the contact digital interface. A modification or change to the display name(s) also may include adding or removing any one of an emoji, emoticon, an image, a video, a three-dimensional graphic, name, or alpha-numeric character within the contact digital interface. A modification to the display name within the contact digital interface may also include a modification to the type, shape, or style of the digital expression object.

In one example, the system identifies which set of contacts have a modified display name within the contact digital interface by using the machine vision module 956 to identify the modified display name or whether the contact digital interface includes an modified, added or removed avatar, emoji, icon, image, 2D, or 3D image, based on the content of an image or images in the contact digital interface. Machine vision module 956 includes hardware, firmware, and/or software for analyzing and understanding content.

In block 1006, the server computer generates a first group contact interface that includes the first set of contacts and the modification. The first set of contacts may include the added or removed emoji, emoticon, an image, a video, a three-dimensional graphic, name, or alpha-numeric character within the contact digital interface as an identifier within the display interface. The first group contact interface can be an interface containing an arrangement, listing, or collection of contacts with modified display names or digital expression objects. At block 1008, the server computer generates a new group contact list. In one example, the new group contact list includes the first set of contacts that include the modification. At block 1010, the server computer associates the first group contact interface with the new group contact lists. For example, if the user recently modified 5 contacts within her contact lists by editing the digital expression object (e.g. emoji) of any one of the contacts, the server computer will aggregate each of the 5 contacts with the edited emoji and compile them into one newly generated group contact lists and arrange them into the first group contact interface. Further, the modified or edited emoji can be used to identify the first group contact interface. For example, if the edited emoji is a "heart," then a "heart emoji" will represent the newly generated group contact lists and be stored in the contact list and/or displayed within the interface of the messaging client application.

At block 1012, the server computer causes the first group contact interface to be displayed by the client device. For instance, the messaging client application 104 may include a display interface configured to send content collection, ephemeral messages, non-ephemeral or any type of data to another device.

In another example, the server computer sends data corresponding to the first group contact interface and the newly generated group contact lists to the client device. The client device receives the data and causes the first group contact interface corresponding to the newly generated group contact list to be displayed on a display of the client deice. In one example, server computer may send instructions for the modified or edited emoji of the newly generated group contact lists to be displayed in the contact lists of the client device.

The first group contact interface may correspond to a newly generated group content list comprising indefinite amount of contacts from the plurality of contacts received by the server, in which each contact within the generated first group contact interface may include the modified display name within each of the associated contact digital interfaces. Although a "first" group contact interface is generated, any number of contact group interfaces may be generated according to a number of display name changes. For example, a contact interface for each set of five different sets of contacts may have been modified. For instance, the contact interface for the first set of contacts is modified to include a basketball emoji, the contact interface for the second set of contents is modified to include a football emoji, the contact interface for the third set of contents is modified to include a tennis emoji, the contact interface for the fourth set of contents is modified to include a baseball emoji, and the contact interface for the fifth set of contents is modified to include a soccer emoji.

In this example, the server computer generates five new group contact lists each comprising a respective set of contacts and sets or assigns each modified emoji (digital expression object) as the representing or identifying emoji for the entire group contact list. For example, the server computer generates a first new group contact list comprising the first set of contacts and associates the first new group contact list with the basketball emoji, the server computer generates a second new group contact list comprising the second set of contacts and associates the second new group contact list with the football emoji, and so on.

In another embodiment, if the user modified or edited at least five or more of his or her contact display names to include a particular emoji, then that emoji may be used to generate the first group contact interface for a new group contact list that includes those particular contacts. In one example embodiment, the new group contact list is ranked based on the length of the list (e.g., from longest to shortest or vice versa). Once two or more newly generated group contact lists have been created, the new group contact lists can organize and sort the generated group contact lists according to frequency of use. The associated first group contact interface may be displayed by the client device within an interface on a display of the client device.

As previously mentioned, the display name (e.g., the digital expression object, emoji, or emoticon) that has been modified, may be used to generate and/or identify a group contact interface for a newly generated group contact list. The method above may be incorporated into the "send to" interface of a social media application (explained below). In another embodiment, the method may include processing, by the server computer using machine vision, the plurality of contact digital interfaces to identify a second set of contacts in the plurality of contacts, the second set of contacts do not include the modification. The method may further include generating a second contact group interface that includes the second set of contacts and further generating a second group interface that is overlaid over a portion of the first contact group interface.

In another embodiment, the method 1100 may be performed by a client device in accordance with the present disclosure. For example, a client device can transmit, to a server computer, a plurality of contacts, each of the plurality of contacts having a display name, receive a modified display name, store the modified display name, generate a first group contact interface based on the stored modified display name, and generate a new group contact list that includes the first set of contacts. In another example, the client device can associate the first group contact interface with the new group contact list display the first group contact interface in the messaging client application interface.

Figure 11:
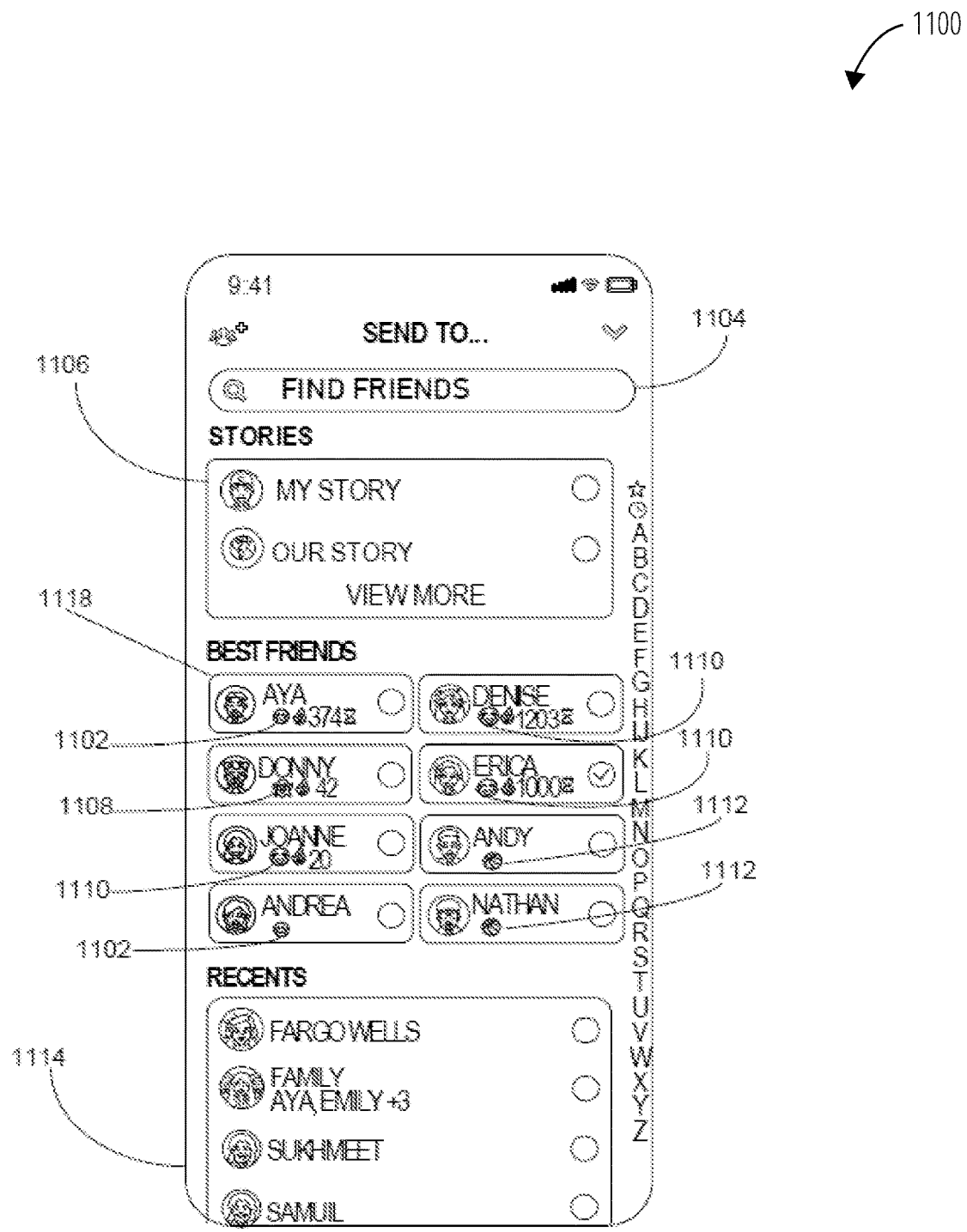
FIG. 11 illustrates a send to user interface 1100 for sending a content collection and/or ephemeral message communication via a messaging system (e.g., messaging server system 108), in accordance with one embodiment of the present disclosure.

FIG. 11 illustrates a send to user interface 1100 for sending a content collection and/or ephemeral message communication via a messaging system (e.g., messaging server system 108), in accordance with one embodiment of the present disclosure. As shown in FIG. 11, the send to user interface 1100 allows a user to search for users via search field 1104, receive contact information from users of the messaging system and communicate a content collection, a non-ephemeral message, or ephemeral message to the selected contacts. The content collection or ephemeral message is transmitted to the contact(s) and/or group contact list(s) selected by the user. A digital representation character 1106 may be arranged to identify the user's content collection, e.g. "My content collection" or "Our Content collection." The contact digital interface 1118 may include a modified or edited display name, which can include, a modified digital expression image 1102.

The display name within the contact digital interface 1118 includes a digital expression object 1102, name, nick-name, digital icon, digital image representation, digital expression image, or three-dimensional character of the stored contact, an avatar, emoji, user interaction counter icon, and/or emoticon. The user interaction counter icon includes the number of ephemeral messages communicated between the user device and a plurality of other user devices, including users devices associated with the user's associated contacts. The modified digital expression image includes the emoji, which in this example is a "happy face" emoji 1102. Additional emojis are shown in each individual contact digital interface 1118 of the individual contacts, which include, a "ghost" emoji 1108, a "crying happy face" emoji 1110, and a "basketball" emoji 1112. As shown, at least eight contact display names have been modified. The current contact list, which include recent modifications, are listed as "best friends" and these contacts are stored in the contact database.

For illustration purposes, eight modifications of display names are shown, however, any number equaling the aggregated amount of contacts stored in the contact database at the request and desire of the user may be modified. The display names may be modified based on a change in emoji, an added emoji, or a change in any portion of the contact digital interface 1118, which includes a change in the digital expression object 1102, name, nick-name, digital icon, digital image representation, digital expression image, or three-dimensional character of the stored contact, an avatar, emoji, user interaction counter icon, or emoticon for each contact's contact digital interface 1118, as explained above. The send to user interface 1200 also includes the most recent contacts 1114 that have received a communicated content collection and/or ephemeral message from the user device.

Figure 12:
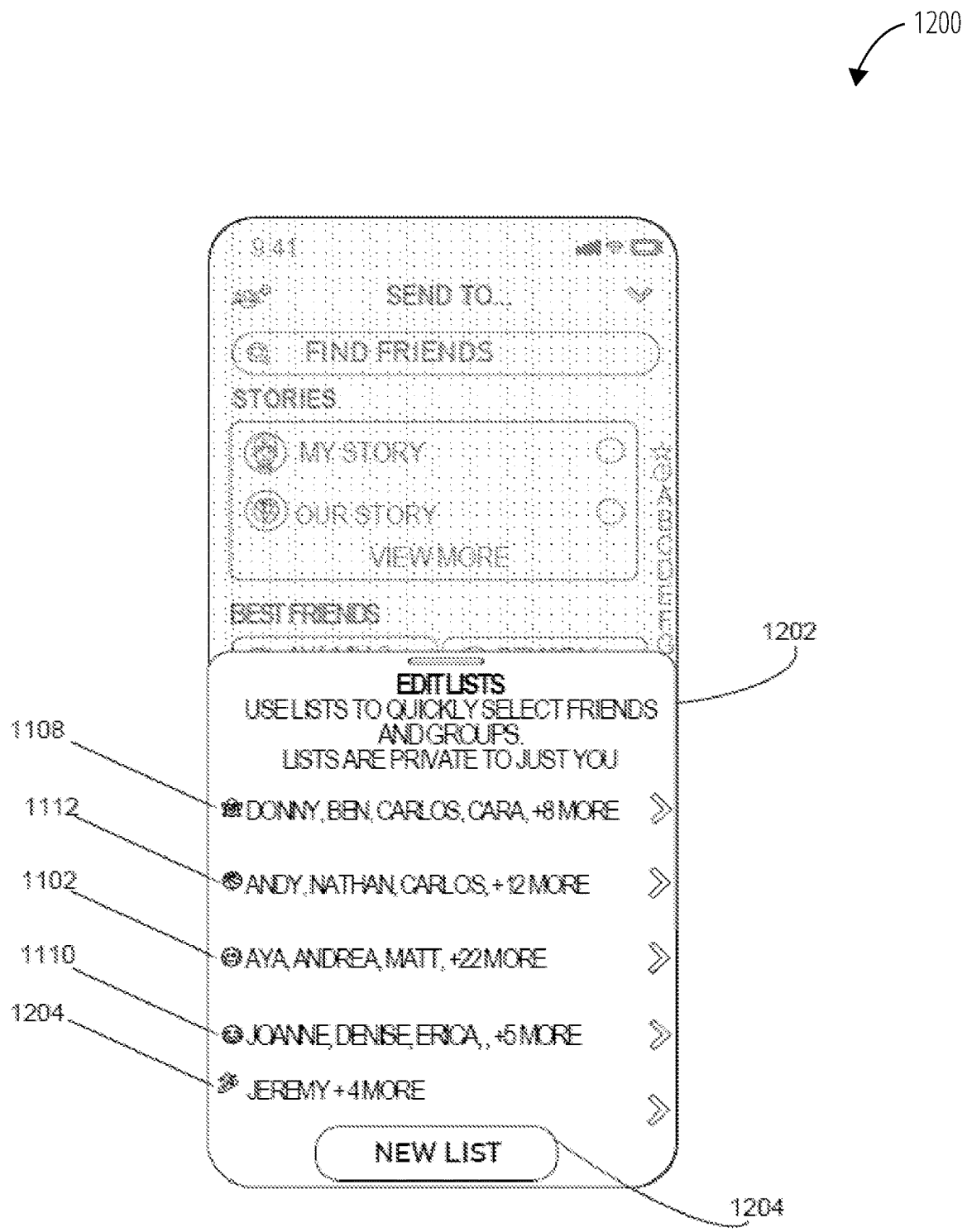
FIG. 12 illustrates a first group contact interface in a send to user interface 1200 for sending a new or recent content collection, non-ephemeral message, and/or ephemeral message communication to a client device in accordance with one embodiment of the present disclosure.

FIG. 12 illustrates a first group contact interface in a send to user interface 1200 for sending a new or recent content collection, non-ephemeral message, and/or ephemeral message communication to a client device in accordance with one embodiment of the present disclosure. The send to user interface 1200 illustrates a first group contact interface 1202. The first group contact interface 1202 comprises the newly generated group contact lists of user contacts with modified display names. For instance, five newly generated group contact lists are generated in the first group contact interface 1202, which are identified by the modified digital expression emoji in which was modified by the user. For example, the ghost emoji 1108 is the group contact interface corresponding to the newly generated first group contact lists which includes contacts "Donny, Ben, Carlos, Cara, +8 more". In this example, each individual's contact display name has been modified to add the ghost emoji 1108 for the newly generated first group contact list.

Additional newly generated group contact lists displayed in the first group contact interface 1202 with their identified emojis include the basketball emoji 1112 where "Andy, Nathan, Carols, +12 more" contacts have been included and modified; the happy face emoji 1102 where "Aya, Andrea, Matt, +22 more" contacts that have been included and modified; the crying happy face emoji 1110 where "Joanne, Denise, Erica, +5 more" contacts that have been included and modified; and the surfer where "Jeremy, +4 more" contacts that have been included and modified. In an alternate embodiment, the user may also manually create a new group contact lists by pressing the new list 1204 button.

Figure 13:
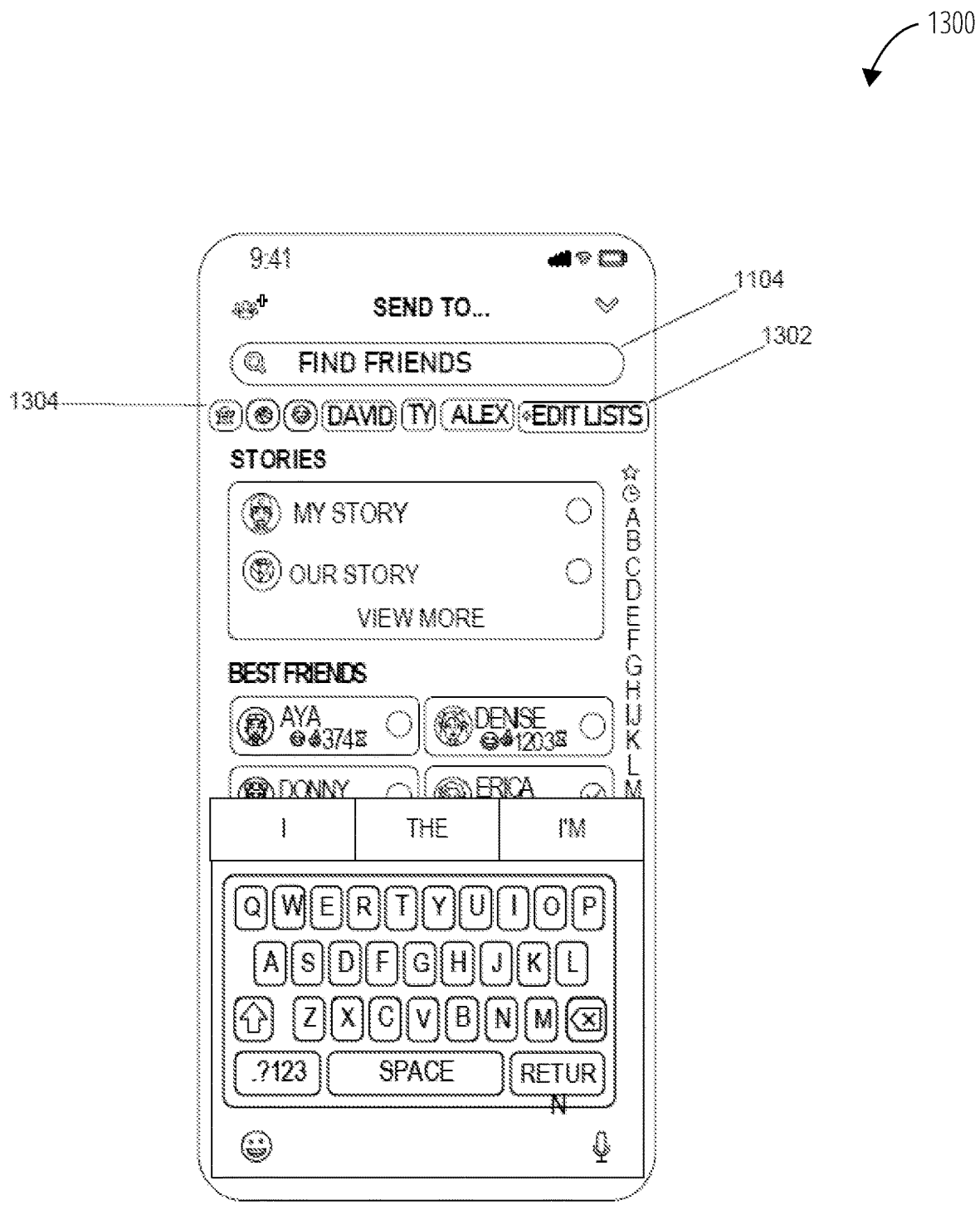
FIG. 13 illustrates the send to user interface for sending a content collection, non-ephemeral message communication, and/or ephemeral message communication with the assigned emojis displayed as a lists shortcut 1304 in accordance with one embodiment.

FIG. 13 illustrates the send to user interface for sending a content collection, non-ephemeral message communication, and/or ephemeral message communication of FIG. 11 with the assigned emojis displayed as a lists shortcut 1304 in accordance with one embodiment. The send to interface 1300 includes an arrangement of the assigned generated group contact lists, which also may be referred to as list shortcuts 1304, at an upper section below the search filed 1104.

The lists shortcuts 1304 may also be positioned at a top, bottom, or side portion of the user interface and may include the modified digital expression image emojis 1108, 1112, and 1110. An edit lists 1302 function button may also be arranged within the lists shortcuts 1304. The edit lists 1302 function button permits the user to edit the group contact lists by removing or altering individual contacts within the generated contact lists. The edit lists 1302 may also allow the user to add additional contacts to the newly generated group contact lists.

Figure 14:
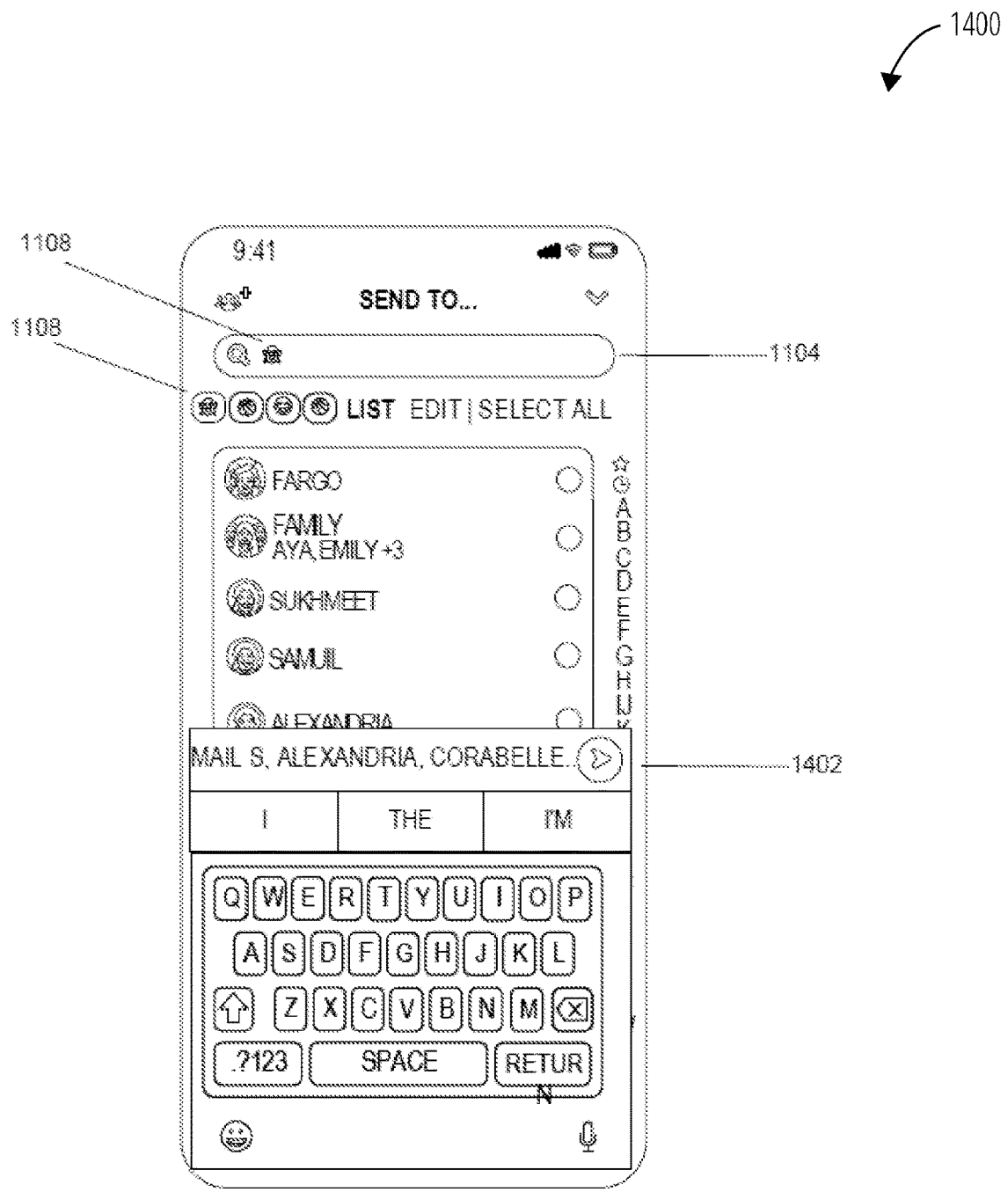
FIG. 14 illustrates a send to user interface 1400 for sending a content collection and/or ephemeral message communication using the assigned digital expression object, e.g. emoji 1108 in the search field in accordance with the present disclosure.

FIG. 14 illustrates a send to user interface 1400 for sending a content collection and/or ephemeral message communication using the assigned digital expression object, e.g. emoji 1108 in the search field in accordance with the present disclosure. For example, the modified digital expression object, e.g. emoji 1108 is entered into the search field 1104 as a shortcut to indicate that the content collection and/or ephemeral or non-ephemeral message specified by the user be sent to the designated group contact list assigned to the emoji 1108. Thus, in order to save time per content collection transmission to the designated contacts, the user may enter the recently modified emoji, for instance emoji 1108, into the send to search field 1104 instead of individually searching for and selecting each contact.

As explained above, the method can compare the newly generated group contact list corresponding to emoji 1108 with other contact lists, such as a "friends" or "best friends" contact list, to determine duplicative and uncommon contacts between each list. In another example, the method generates and causes display of a separate interface 1402 that includes the duplicative and/or uncommon contacts from the generated group contact list corresponding to emoji 1108.

Figure 15:
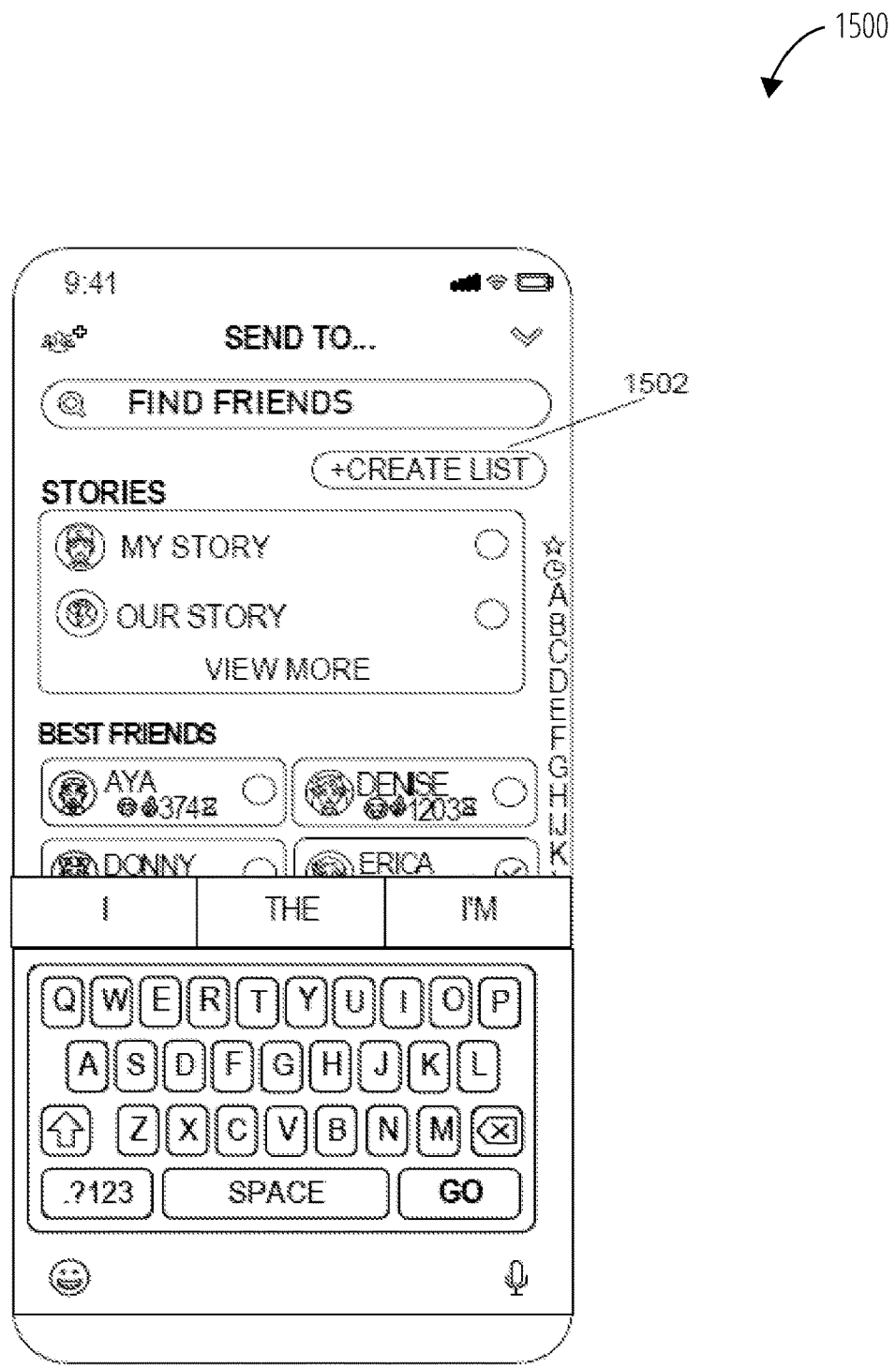
FIG. 15 illustrates a send to user interface 1500 for sending a content collection, non-ephemeral message, or ephemeral message communication by creating a group contact list in accordance to the present disclosure.

FIG. 15 illustrates a send to user interface 1500 for sending a content collection, non-ephemeral message, or ephemeral message communication by creating a group contact list in accordance to the present disclosure. In one example, a create list 1502 button is positioned in an upper portion of the send to user interface 1500 and when pressed, permit the user to select a radio button associated with each contact within the contact list and manually generate a new group contact list. The user of the client device may base the criteria of which contact will be in the new group contact list on user preferences such as, recently edited emojis, friends, non-friends, membership, and so on. In another example, by selecting the create list button 1502 to manually create a new group contact list, the user is presented with a list of contacts to add to the new group contact list.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computing apparatus comprising:
a processor; and
a memory storing instructions that, when executed by the processor, configure the apparatus to:
access a contact database of a sending user, the contact database comprising a plurality of contact records, each contact record of the plurality of contact records being associated with a respective user and including respective graphic data;
identify a first set of contact records of the plurality of contact records, each contact record of the first set of contact records having common graphic data as part of the respective graphic data;
include the first set of contact records in a contact group of a messaging application of the sending user;
detect a send message operation by a messaging application of the sending user; and
cause presentation of a user-selectable graphic icon associated with the contact group within the messaging application, the user-selectable graphic icon being selectable by the sending user to send a message to the contact group.

2. The computing apparatus of claim 1, wherein the common graphic data comprises graphic data depict a common theme.

3. The computing apparatus of claim 1, wherein the common graphic data comprises a graphic icon.

4. The computing apparatus of claim 1, wherein the instructions that, when executed by the processor, configure the apparatus to, responsive to detecting user selection of the user-selectable graphic icon associated with the contact group, automatically to transmit a message to a respective contact address included in each of the first set of contact records.

5. The computing apparatus of claim 1, wherein the instructions that, when executed by the processor, configure the apparatus to receive the respective graphic data included in each of the plurality of contact records from the sending user, and to store the respective graphic data as part of each of the plurality of contact records in the contact database.

6. The computing apparatus of claim 5, wherein the respective graphical data is received from the sending user via a contact interface.

7. The computing apparatus of claim 1, wherein the identifying of the first set of contact records of the plurality of contact records comprises analyze, using machine vision, the plurality of contact records to identify the first set of contact records.

8. The computing apparatus of claim 1, wherein the instructions that, when executed by the processor, configure the apparatus to automatically generate a group graphic identifier for the user-selectable graphic icon based on the common graphic data.

9. The computing apparatus of claim 8, wherein the instructions that, when executed by the processor, configure the apparatus to automatically modify the respective graphical data of each contact record of the first set of contact records to include the group graphic identifier.

10. The computing apparatus of claim 8, wherein the instructions that, when executed by the processor, configure the apparatus to receive the common graphic data via a search interface, and to identify the first set of contact records of the plurality of contact records responsive to receipt of the common graphic data via the search interface.

11. A computer-implemented method comprising:
accessing a contact database of a sending user, the contact database comprising a plurality of contact records, each contact record of the plurality of contact records being associated with a respective user and including respective graphic data;
using at least one processor, identifying a first set of contact records of the plurality of contact records, each contact record of the first set of contact records having common graphic data as part of the respective graphic data;
using the at least one processor, automatically including the first set of contact records in a contact group of a messaging application of the sending user;
using the at least one processor, detecting a send message operation by a messaging application of the sending user; and
using the at least one processor, causing presentation of a user-selectable graphic icon associated with the contact group within the messaging application, the user-selectable graphic icon being selectable by the sending user to send a message to the contact group.

12. The method of claim 11, wherein the common graphic data comprises graphic data depicting a common theme.

13. The method of claim 11, wherein the common graphic data comprises a graphic icon.

14. The method of claim 11, comprising, using the at least one processor and responsive to detecting user selection of the user-selectable graphic icon associated with the contact group, automatically transmitting a message to a respective contact address included in each of the first set of contact records.

15. The method of claim 11, comprising receiving the respective graphic data included in each of the plurality of contact records from the sending user, and storing the respective graphic data as part of each of the plurality of contact records in the contact database.

16. The method of claim 15, wherein the respective graphical data is received from the sending user via a contact interface.

17. The method of claim 11, wherein the identifying of the first set of contact records of the plurality of contact records comprises analyzing, using machine vision, the plurality of contact records to identify the first set of contact records.

18. The method of claim 11, comprising automatically generating a group graphic identifier for the user-selectable graphic icon based on the common graphic data.

19. The method of claim 18, comprising receiving the common graphic data via a search interface, and identifying the first set of contact records of the plurality of contact records responsive to receipt of the common graphic data via the search interface.

20. The method of claim 18, comprising automatically modifying the respective graphical data of each contact record of the first set of contact records to include the group graphic identifier.

\* \* \* \* \*